United States Patent [19]

Akita et al.

[11] Patent Number: 4,790,403
[45] Date of Patent: Dec. 13, 1988

[54] OUTPUT CONDITION MONITOR APPARATUS FOR A VELOCITY SUSTAINING DEVICE

[75] Inventors: Tokihiko Akita, Toyota; Hitoshi Hyodo, Okazaki, both of Japan

[73] Assignee: Aisin Seiki Kabushiki Kaisha, Kariya City, Japan

[21] Appl. No.: 943,010

[22] Filed: Dec. 18, 1986

[30] Foreign Application Priority Data

Dec. 21, 1985 [JP] Japan .................. 60-288157

[51] Int. Cl.$^4$ ............................................ B60K 31/06
[52] U.S. Cl. .................. 180/176; 180/177; 123/360; 364/184; 364/431.07
[58] Field of Search .............. 180/175, 176, 177, 178, 180/179; 371/67, 62, 71; 364/426, 431.07, 184; 123/352, 360, 361, 399

[56] References Cited

U.S. PATENT DOCUMENTS

| | | | |
|---|---|---|---|
| 4,120,373 | 10/1978 | Fleischer | 180/179 |
| 4,158,192 | 6/1979 | Muto | 180/177 |
| 4,522,280 | 6/1985 | Blarey | 180/179 |
| 4,539,642 | 9/1985 | Mizuro et al. | 364/426 |
| 4,646,861 | 3/1987 | Kawata et al. | 180/176 |

FOREIGN PATENT DOCUMENTS 178840 10/1983 Japan .................. 180/175
2120428 11/1983 United Kingdom ............ 364/184

Primary Examiner—David M. Mitchell
Assistant Examiner—Brian L. Johnson
Attorney, Agent, or Firm—Sughrue, Mion, Zinn, Macpeak, and Seas

[57] ABSTRACT

A vacuum actuator for actuating the throttle valve of a vehicle is driven by a surge tank via three valves which are actuated by their respective solenoids. These solenoids are energized by their respective driver circuits. The input signal applied to each solenoid is compared with the output signal delivered from the solenoid by a comparator. The comparators for the solenoids are incorporated in a microcomputer. If any one of the comparators indicates disagreement between its two input signals, and if this disagreement persists for a given period, then the microcomputer deenergizes the corresponding solenoid. A timer for measuring the duration of the disagreement is also incorporated in the microcomputer. For example, the invention can be employed in a velocity-sustaining device for a vehicle.

1 Claim, 5 Drawing Sheets

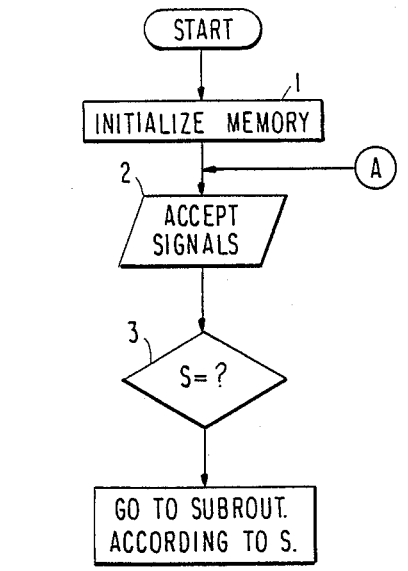
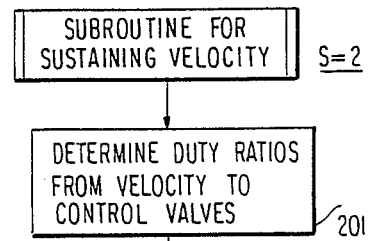
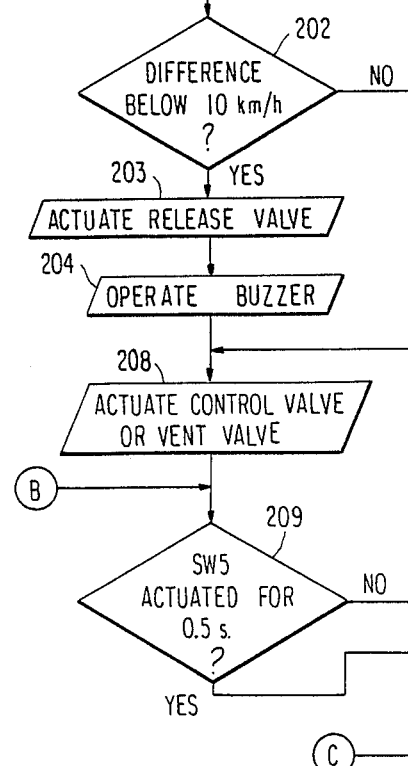
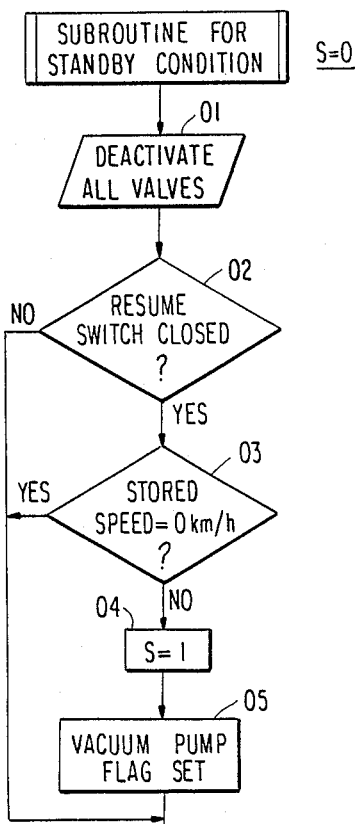
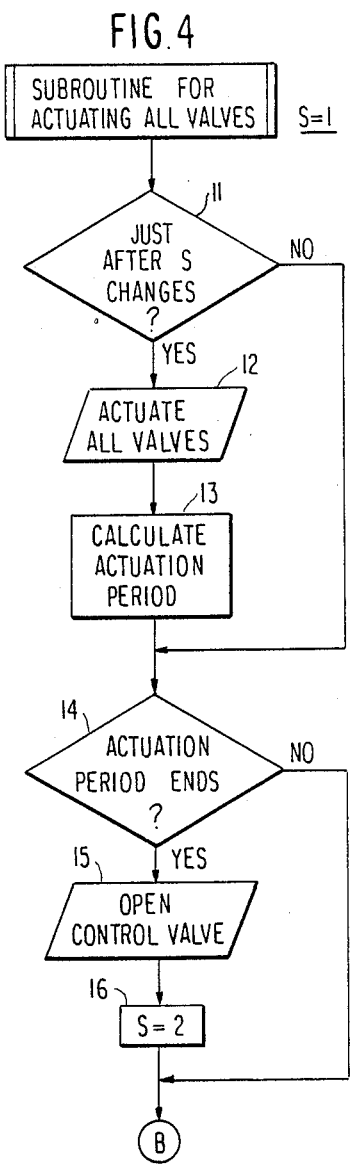

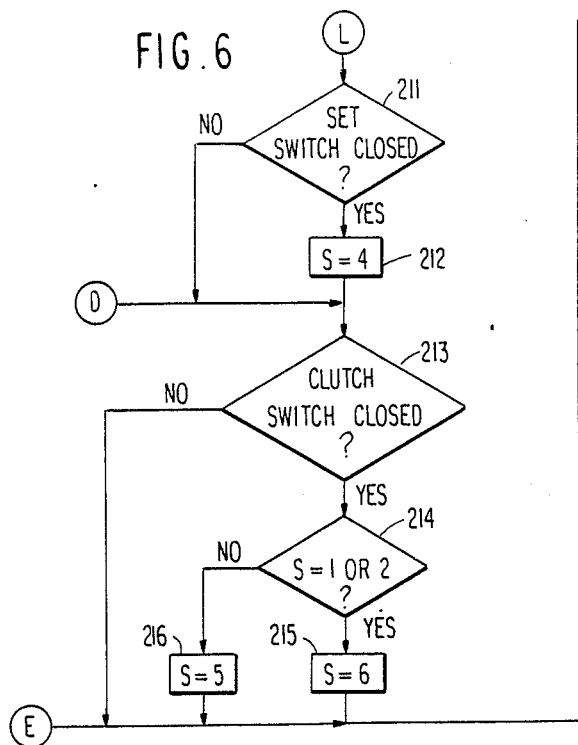
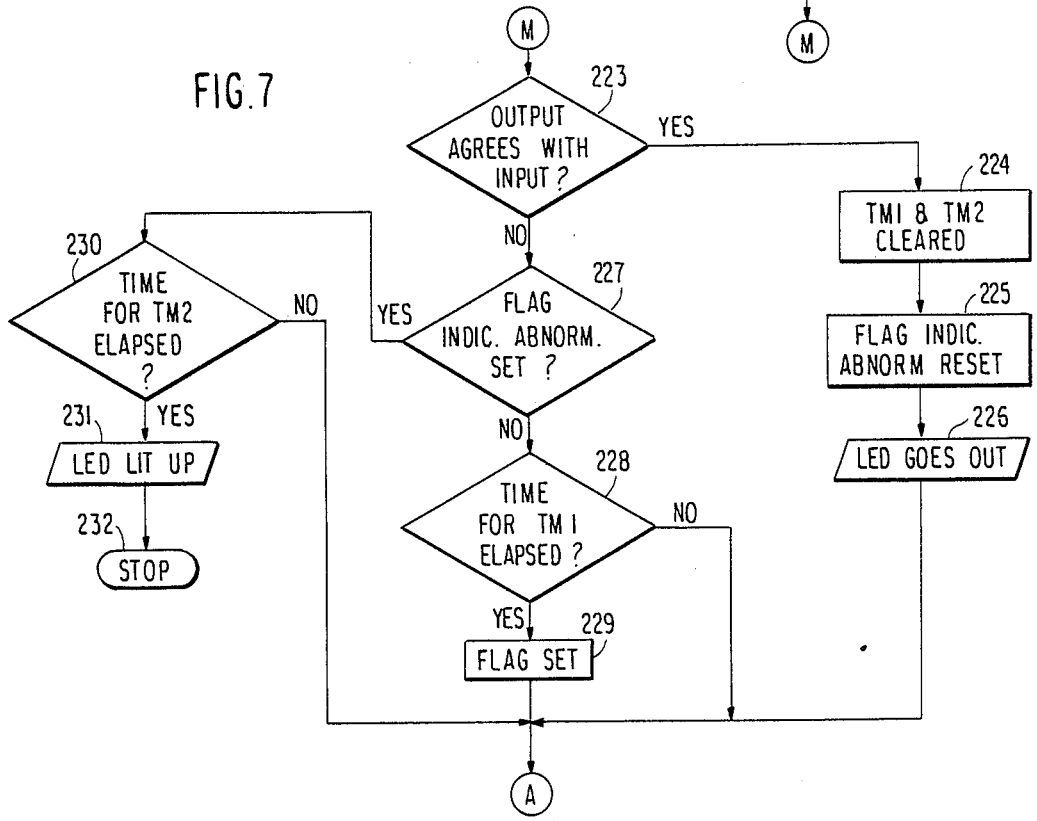

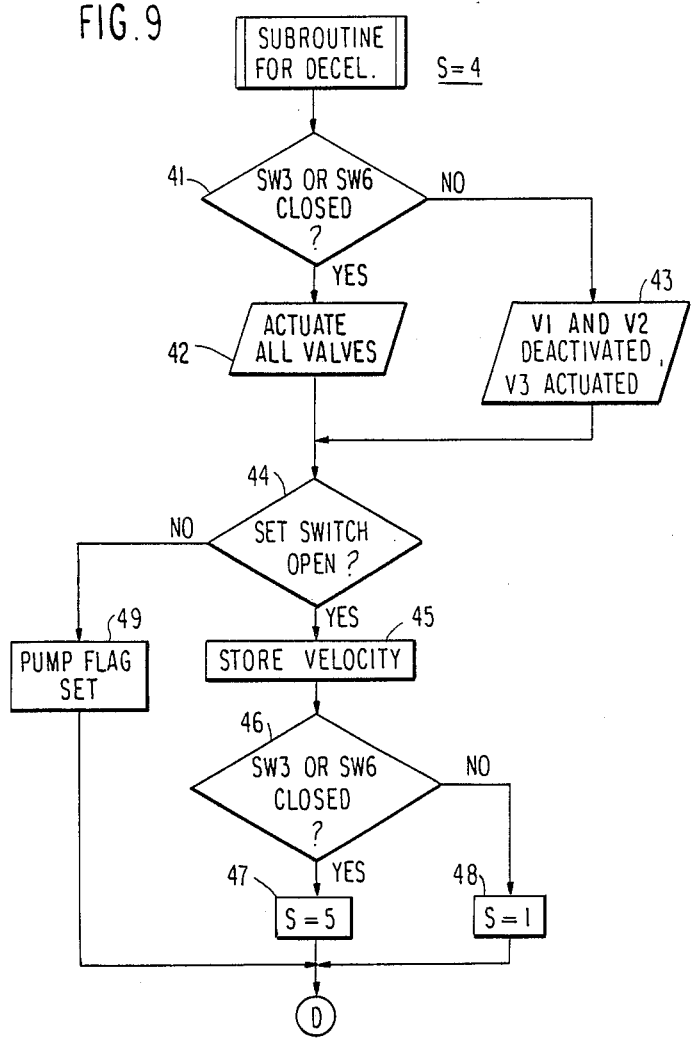
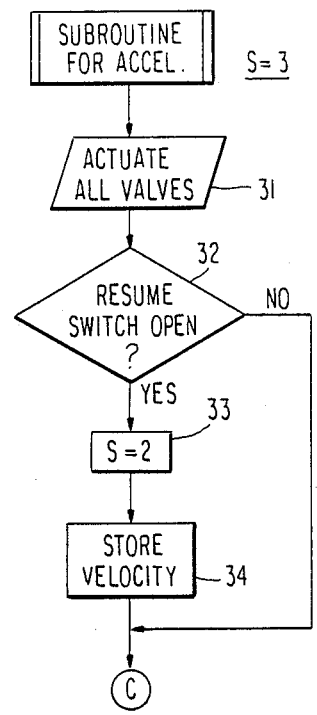
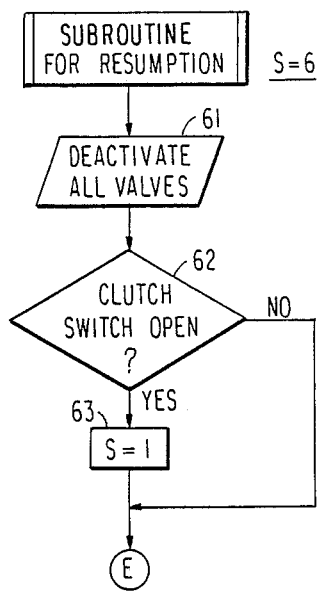
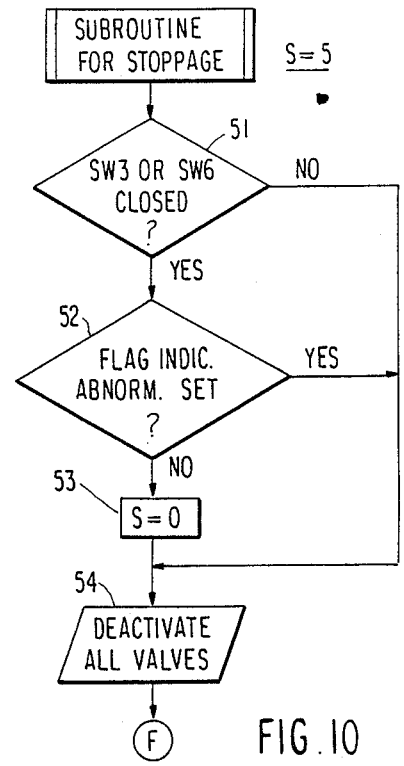

OUTPUT CONDITION MONITOR APPARATUS FOR A VELOCITY SUSTAINING DEVICE

FIELD OF THE INVENTION

The present invention relates to an apparatus for monitoring the outputs of solenoids that are energized with outputs from an electronic control means to drive an actuator. For example, the invention can be employed in a velocity sustaining apparatus which stores a desired velocity in its memory and automatically maintains the vehicle at the stored velocity.

BACKGROUND OF THE INVENTION

An output condition monitor apparatus of this kind is disclosed in Japanese Patent Laid-Open Patent No. 178840/1983. FIG. 14 of the present application is a circuit diagram of the fundamental configuration of a velocity sustaining apparatus making use of this conventional output condition monitor apparatus. The illustrated apparatus comprises an electronic control unit, or central processing unit (CPU), that consists of a microcomputer fabricated on a single integrated circuit chip. The CPU receives output signals from various switches including a reed switch for detecting the velocity of the vehicle, a clutch switch for producing a signal when the driver presses down on the clutch pedal, a brake switch for producing a signal when the driver presses down on the brake pedal, a set switch, and a resume switch. Also, the output signal from a vacuum switch disposed in the surge tank is applied to the CPU. A solenoid that is used with a control valve for controlling a vacuum actuator, a solenoid for use with a vent valve, and a solenoid for use with a release valve are connected with the output of the CPU via their respective driver circuits. These three solenoids are connected with the inputs of their respective detector circuits, which are coupled to the CPU.

FIG. 14 shows a portion of the configuration as described above. Each solenoid VL is energized by a driver circuit comprising a pull-up resistor R1 and a switching transistor Q1, the solenoid VL being used with a valve that is controlled by the CPU. A detector circuit for detecting the signal delivered from the solenoid VL to the CPU comprises a pull-up resistor R2 and a switching transistor Q2. A diode FD is used to produce a flywheel effect.

In the structure constructed as described above, when the output from the CPU goes high, the transistor Q1 is turned on. Then, the solenoid VL is energized to actuate the valve. At this time, the transistor Q2 is not conducting, and the input to the CPU is at high level. When the output from the CPU goes low, the transistor Q1 is turned off to deenergize the solenoid VL for use with the valve. At this time, the transistor Q2 conducts, and the input to the CPU goes low. Under this normal condition, the input to the CPU coincides with the output from the CPU.

If the solenoid VL that acts on the valve breaks, the transistor Q2 always fails to conduct. Under this condition, the input to the CPU is at high level and retained at this level even if the output from the CPU goes low. Thus, the disagreement between the input and the output is detected by a comparator means. If this state persists over a given period, then the condition is regarded as abnormal, followed by inhibition of the operation of the CPU. The same principles apply when the solenoid VL for use with the valve is short-circuited.

However, a problem takes place when the solenoid VL is short-circuited. Specifically, whenever the solenoid VL is short-circuited, the transistor Q2 conducts, bringing the signal applied to the CPU to low state which is not altered even if the output from the CPU goes high. The disagreement between them is detected by the comparator means. If this condition persists over a given period, it is judged to be abnormal. Then, the control operation will be stopped, but the recurring output from the CPU permits such a control operation for a short time. Especially, when such a short-circuit takes place, an abnormal large current flows repeatedly through the short-circuited location.

SUMMARY OF THE INVENTION

Accordingly, it is an object of the present invention to provide an output condition monitor apparatus which limits the maximum amount of electric power consumed at a place where abnormality takes place.

The above object is achieved by the teachings of the invention by an output condition monitor apparatus comprising: solenoids which drive an actuator and are energized according to outputs from an electronic control means; comparator means for comparing the outputs from the electronic control means with the inputs to the solenoids; monitor means which halt the operation of the electronic control means when an error signal from the comparator means persists over a given period; and time limit means which prevent the electronic control means from resuming its normal operation when the output from the monitor means persists for a certain period.

In the monitor apparatus according to the invention, the outputs from the electronic control means are compared with the inputs to the solenoids that drive the actuator. When an error signal from the comparator means persists over a given period, the operation of the electronic control means is halted. If this halted condition persists for a certain period, the electronic control means is prevented from resuming its normal operation. In this way, the continued halted condition limits the maximum amount of electric power consumed at a location where abnormality occurs.

Other objects and features of the invention will appear in the course of the description thereof which follows.

BRIEF DESCRIPTION OF THE DRAWINGS

FIGS. 2–13 are flowcharts for illustrating the velocity-sustaining operation of the electronic control apparatus of the monitor apparatus shown in FIG. 1.

DETAILED DESCRIPTION OF THE INVENTION

Figure 1:
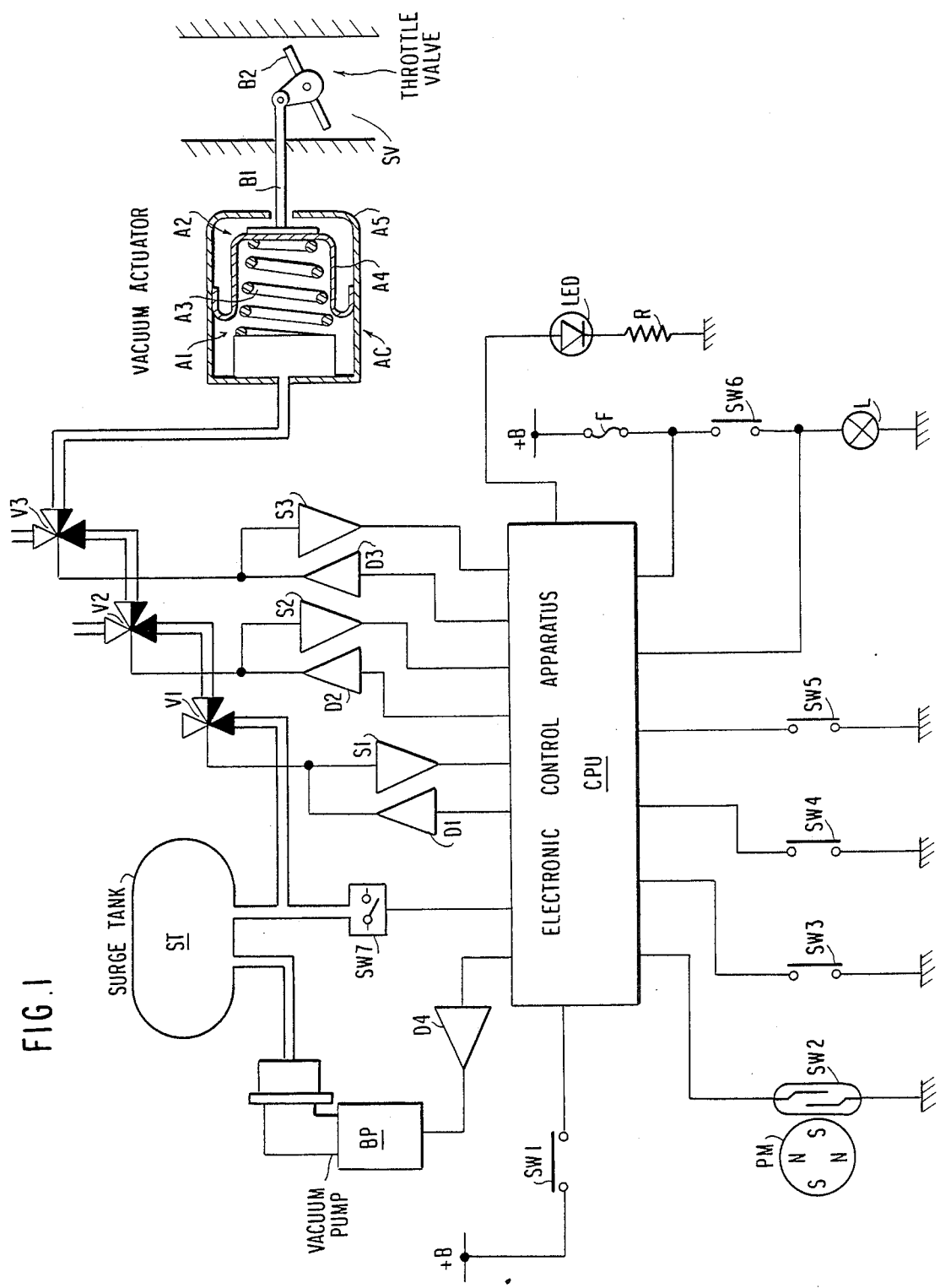
FIG. 1 is a circuit diagram of a velocity-sustaining apparatus incorporating an output condition monitor apparatus according to the invention.
Figure 12:
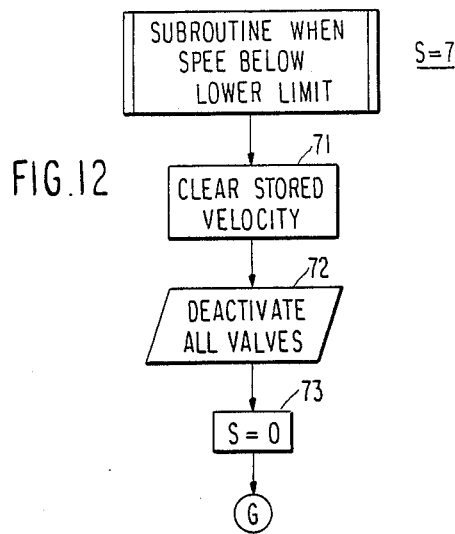

FIG. 1 is a circuit diagram of a velocity-sustaining apparatus incorporating an output condition monitor apparatus according to the invention. The velocity-sustaining apparatus has an electronic control apparatus, or CPU, consisting of a microcomputer built on a single integrated-circuit chip. This CPU constitutes an electronic control means and receives output signals from a reed switch SW2, a clutch switch SW3, a brake switch SW6, a set switch SW4, and a resume switch SW5. The reed switch SW2 detects a signal indicating the velocity of the vehicle in which the present velocity-sustaining apparatus is installed. The clutch switch SW3 produces an output signal when the driver presses down on the clutch pedal (not shown). The brake switch SW6 produces an output signal when the driver pushes down on the brake pedal (not shown). The opening of a throttle valve SV is controlled by a vacuum actuator AC which is operated by a vacuum created by means of a vacuum pump BP. The vacuum is stored in a surge tank ST in which a vacuum switch SW7 is disposed. The output from this switch SW7 is applied to the CPU. Once the operation for maintaining the vehicle at a constant velocity stored in the CPU is halted, the operation can be resumed by operating the resume switch SW5. The operation for retaining the vehicle at a constant velocity can be stopped by operating either the clutch switch SW3 or the brake switch SW6.

A permanent magnet PM connected to a speedometer cable (not shown) is disposed near the reed switch SW2. As the vehicle moves, the magnet PM rotates to open and close the contact of the reed switch SW2. Thus, pulses of a frequency proportional to the velocity of the vehicle are supplied to the CPU. The clutch switch SW3 opens or closes in response to the movement of the clutch pedal. The brake switch SW6 opens or closes in response to the movement of the brake pedal. A stop lamp L is connected with the brake switch SW6, and is lit up when the switch SW6 is closed.

The set switch SW4 and the resume switch SW5 are push-button switches and disposed in such locations that the driver can easily operate them. A desired velocity is stored in the CPU by depressing the set switch SW4. At the same time, the operation for maintaining the vehicle at the stored velocity is initiated. This operation can be terminated by depressing the brake switch SW6, but the velocity remains stored in the CPU. When the resume switch SW5 is depressed, the operation for retaining the vehicle at the constant velocity which was stored in the CPU before the operation was terminated is restarted.

Figure 14:
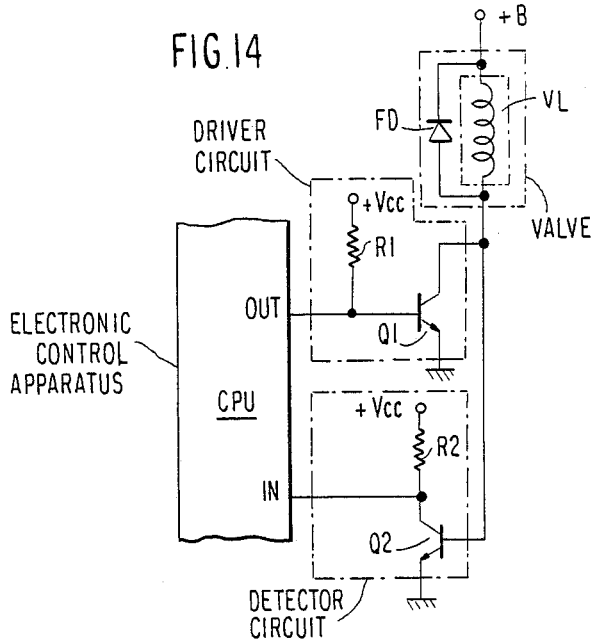
FIG. 14 is a circuit diagram of the essential configuration of a conventional output condition monitor apparatus.
Figure 13:
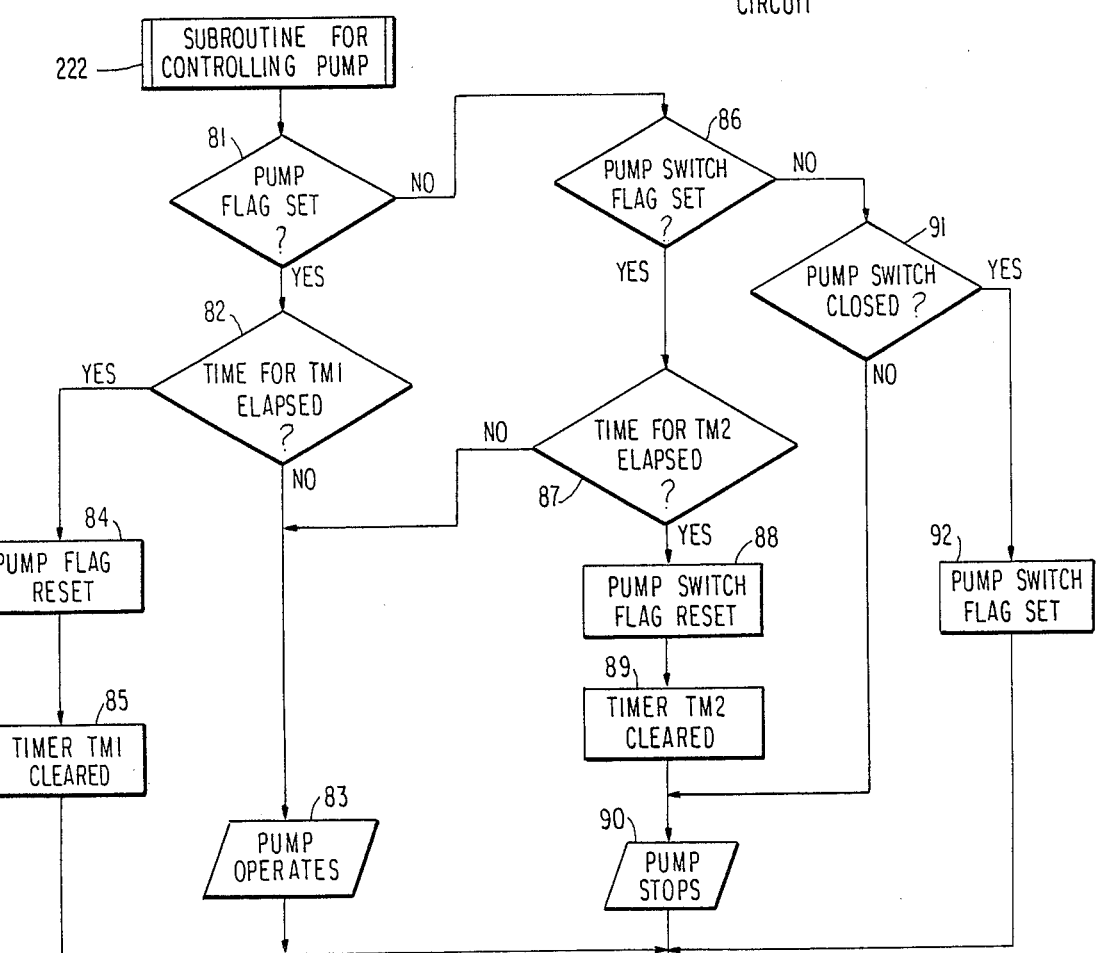

A light-emitting diode (LED) for indicating an abnormal condition is lit up when it is difficult to control the velocity-sustaining apparatus and so the operation for maintaining the vehicle at a constant velocity is halted. A current-limiting resistor R is connected to the LED. A power supply is connected via a fuse F with the brake switch SW6. Another power supply is connected with the CPU via a power switch SW1. A solenoid for use with a control valve V1, a solenoid for use with a vent valve V2, and a solenoid for use with a release valve V3 are connected with the output of the CPU via their respective driver circuits D1, D2, D3. The control valve V1 acts to control the vacuum actuator AC (described in detail later). Also, the motor of a vacuum pump BP is connected with the output of the CPU via a driver circuit D4. Detector circuits S1, S2, S3 for detecting the output signals from driver circuits D1, D2, D3, respectively, are connected with the output of the CPU. The driver circuits D1, D2, D3 for energizing the solenoids are similar to the conventional driver circuit shown in FIG. 14. Also, the detector circuits S1, S2, S3 for detecting the output signals from the driver circuits D1–D3 are similar to the conventional detector circuit shown in FIG. 14.

The vacuum actuator AC forms a vacuum chamber A1 within a housing A5. The chamber is sealed by a diaphragm A4 placed in the housing. The opposite side A2 of the diaphragm A4 is in communication with the atmosphere. A compressed coiled spring A3 that is disposed within the vacuum chamber A1 biases the diaphragm A4. A throttle rod B1 is joined to the diaphragm A4 to open or close the movable member B2 of the throttle valve SV. The negative pressure inside the surge tank ST is introduced into the vacuum chamber A1 within the actuator AC via the control valve V1, the vent valve V2, and the release valve V3.

When the solenoid for the control valve V1 is energized, the valve allows the negative pressure inside the surge tank ST to be transferred to the actuator AC. When the solenoid is not energized, the valve V1 disconnects the actuator from the tank. When the solenoid for the vent valve V2 is energized, the valve V2 permits the negative pressure sent through the control valve V1 to be directed to the actuator AC. When this solenoid is not energized, the valve V2 causes the negative pressure inside the actuator AC to discharge into the atmosphere. When the control system malfunctions, making appropriate control impossible, the release valve V3 causes the negative pressure inside the chamber A1 of the actuator AC to discharge into the atmosphere, so that the pressure inside the chamber A1 is raised to the atmospheric pressure. At this time, the throttle rod B1 is moved rearward to close the movable member B2 of the throttle valve SV. Normally, the solenoid for the release valve V3 is energized, connecting the vacuum chamber A1 of the actuator AC with the vent valve V2.

The signals supplied to the solenoids for energizing the control valve V1 and the vent valve V2 are controlled by the CPU in the manner described below. When the velocity-sustaining apparatus is in operation, the CPU compares the velocity already stored in it with the present velocity and sets the duty ratios of the signals supplied to these two solenoids in such a way that the difference equals null. When it is necessary to reduce the velocity of the vehicle, the duty ratios are reduced. This increases the proportion of time during which the actuator AC is in communication with the atmosphere via the vent valve V2, and the throttle valve SV is closed by the diaphragm A4. On the other hand, when it is necessary to accelerate the vehicle, the duty ratios are increased. This permits the actuator AC to open the throttle valve SV.

The operation of the CPU is next described by referring to the flowchart of FIGS. 2–12. When the ignition switch is turned on, the execution of the present program is initiated. The memory is initialized (step 1). At this time, the controlled state, indicated by S, is set to null (S=0) so that control goes to a "subroutine for standby condition". The output signals from the switches SW2–SW7 are accepted (step 2).

Step 3 represents a decision taken to select a processing function according to the controlled state S. Specifically, a decision is taken to select one of alternative actions according to the controlled state. Therefore, whenever a different function is selected, the controlled state S is set, and control goes to the corresponding subroutine. Since the state is set to null (S=0) at step 1, control goes to the subroutine for standby condition under the condition of S=0.

Subroutine for standby condition (S=0)

In this subroutine, the closure of the resume switch SW5 is detected, and the operation of the control system is stopped. When control enters this subroutine, the solenoids for all the valves, i.e., the control valve V1, the vent valve V2, and the release valve V3, are deenergized (step 01). Then, the vacuum actuator AC is no longer controlled. Thus, the operation for maintaining the velocity constant is stopped. Subsequently, the closure of the resume switch SW5 is detected (step 02). If it is closed, control goes to step 03, where a check is performed to ascertain whether the velocity stored in the memory is equal to 0 km/h, i.e., the memory is cleared. If it is not so, control proceeds to step 04, where the controlled state is set to 1 (S=1) in order to set up a subroutine for actuating all the valves. Then, a flag for operating the vacuum pump BP is set (step 05). That is, preparations for entering the subroutine for actuating all the valves are made. When the resume switch SW5 is not closed, or when the velocity stored in the memory is 0 km/h, i.e., the memory is cleared, the control system is not restored to its original state. Therefore, the controlled state S is not altered.

Subroutine for actuating all valves (S=1)

In this subroutine, an anticipatory control operation is performed to quickly bring the vacuum actuator AC into a desired position. Specifically, in a subroutine for decelerating the vehicle under the condition S=4, the solenoid for the control valve V1 is deenergized. Under this condition, the pressure inside the vacuum chamber A1 of the actuator AC is low. The subroutine for the standby condition is executed either just when the present control operation for maintaining the vehicle velocity at a constant value is initiated or after the execution of a subroutine for stopping the velocity-sustaining operation is terminated. For this reason, the negative pressure created inside the vacuum chamber A1 of the actuator AC does not correspond to the velocity set by the driver. Therefore, if the operation for maintaining the velocity constant were resumed immediately and the duty ratio of the signal applied to the solenoid for the control valve V1 were controlled, then a desired throttle opening would not be immediately achieved. Accordingly, a check is done to see if control first enters this subroutine (step 11). If so, control passes on to step 12, where the solenoids for all the valves, i.e., V1, V2, and V3, are energized. Then, a period which has been previously determined so that its duration is in proportion to the vehicle velocity and during which all the valves are actuated is set up (step 13). If control entered this subroutine at step 11, and this actuation period has been already set, then the control system waits until the actuation period set up at step 14 elapses. Thereafter, the control valve V1 is deactivated (step 15). Then, the controlled state S is set to 2 (S=2) (step 16), and control goes to the subroutine for maintaining the velocity constant.

Subroutine for maintaining the vehicle velocity constant (S=2)

This subroutine is executed to maintain the vehicle at the velocity stored in the memory. First, the vehicle velocity is determined from the output pulses from the reed switch SW2, and then the duty ratios of the signals supplied to the solenoids for actuating the control valve V1 and the vent valve V2 are determined from the velocity (step 201).

Steps 202–207 are carried out when the current velocity of the vehicle cannot be adjusted to the stored velocity for some reason or other while the duty ratios are being controlled. First, a check is performed to determine whether the difference between the actual velocity and the stored velocity exceeds 15 km/h (step 205). If so, the solenoid for the release valve V3 is deenergized to reduce the negative pressure inside the vacuum chamber A1 of the actuator AC in such a way that the inside pressure equals the atmospheric pressure. Further, the throttle valve SV is no longer controlled (step 206). Subsequently, a buzzer is operated to inform the driver of the fact (step 207). When the difference decreases below 10 km/h, the release valve V3 is actuated (step 203). Then, the operation of the buzzer is stopped (step 204). The duty ratios of the signals supplied to the solenoids actuating the control valve V1 and the vent valve V2 are actually controlled to keep the vehicle at a constant speed (step 208). During the period between steps 202 and 205, i.e., while the vehicle is being accelerated so that the difference may increase from 10 km/h to 15 km/h, or during the period between steps 205 and 202, i.e., while it is being decelerated so that the difference may decrease from 15 km/h to 10 km/h, the value that is set to resume the control over the actuator AC is neglected.

If the resume switch SW5 is actuated for a given period, say 0.5 second, (step 209), then the controlled state is set to 3 (S=3) to set up a subroutine for accelerating the vehicle (step 210). If the set switch SW4 is closed (step 211), the controlled state is set to 4 (S=4) to establish a subroutine for decelerating the vehicle (step 212). If the clutch switch SW3 is closed (step 213), then a check is performed to determine whether S=1 or S=2 (step 214). Specifically, the clutch switch SW3 has a resuming function. A check is performed to ascertain whether control enters this subroutine from the subroutine for accelerating the vehicle or from the subroutine for decelerating the vehicle. If control proceeds to this subroutine from either of the two subroutines, then a subroutine for resuming the velocity-sustaining operation is established under the condition of S=6 (step 215). If not so, a subroutine for stopping the operation for maintaining the velocity constant is set up in response to closure of the clutch switch SW3 under the condition of S=5 (step 216). If the brake switch SW6 is closed (step 217), then checks are performed to see whether flags indicating that the output signals from the valves V1–V3 are abnormal are set (step 218). If any one of them is set, the subroutine for stopping the velocity-sustaining operation is established (step 219). A check is effected to ascertain whether the present velocity is less than a given lower velocity limit (step 220). If so, the relation S=7 is set up to prohibit the operation for maintaining the velocity constant (step 221). Then, a subroutine for controlling the vacuum pump is carried out (step 222).

Control proceeds from step 223 to step 232, where a subroutine for monitoring the outputs from the solenoids is carried out. The signal from the output port of the CPU which energizes the driver circuit D1 for energizing the solenoid for the control valve V1 is compared with the signal applied to the input port of the CPU that is connected with the detector circuit S1 for detecting the output from the driver circuit D1. The signal from the output port of the CPU that energizes the driver circuit D2 for energizing the solenoid actuating the control valve V2 is compared with the signal applied to the input port of the CPU that is connected with the detector circuit S2 for detecting the output from the driver circuit D2. Also, the signal from the output port of the CPU that energizes the driver circuit D3 for the solenoid actuating the release valve V3 is compared with the signal applied to the input port of the CPU that is connected with the detector circuit S3 for detecting the output from the driver circuit D3. If they agree, then timers TM1 and TM2 that are used in the output-monitoring subroutine are cleared (step 224). Then, the flags indicating abnormality are reset (step 225). Subsequently, an LED for indicating abnormality is caused to go out (step 226). If the output signals from the CPU do not coincide with the input signals (step 223), control goes to step 227, where checks are performed to ascertain whether the flags indicating abnormality are set (step 227). If none of the flags are set, a check is done to determine whether the period for which the timer TM1 is set elapses (step 228). When the period passes, a flag indicating abnormality is set (step 229). If some flag is set (step 227), then a check is performed to determine whether the duration for which the timer TM2 is set has elapsed (step 230). If it has elapsed, the LED indicating abnormality is lit up (step 231). Further, the operation for maintaining the velocity constant is inhibited (step 232).

Subroutine for accelerating the vehicle (S=3)

This subroutine is carried out to accelerate the vehicle whose velocity is maintained constant by the aforementioned velocity-sustaining operation, for changing the constant velocity to another value. First, all the valves, i.e., the control valve V1, the vent valve V2, and the release valve V3, are actuated (step 31). This increases the negative pressure inside the vacuum chamber A1 of the actuator AC, opening the throttle valve SV. The vehicle is then accelerated until the resume switch SW5 is opened at step 32, whereupon the subroutine for maintaining the vehicle at a constant velocity (S=2) is set up (step 33). This constant velocity is stored in the memory (step 34).

Subroutine for Decelerating the vehicle (S=4)

This subroutine is executed to reduce the velocity of the vehicle which is maintained at a constant value by the aforementioned velocity-sustaining operation and then to resume the velocity-sustaining operation. While this sustaining operation is being performed, if the set switch SW4 is closed, the controlled state is set to four (S=4). As a result, control goes to this subroutine for decelerating the vehicle. A check is performed to determine whether the clutch switch SW3 or the brake switch SW6 is closed (step 41), the switches SW3 and SW6 being capable of stopping the operation for maintaining the velocity constant. If either of them is closed, all of the valves V1-V3 are opened to terminate the velocity-sustaining operation (step 42). If it is found that neither the clutch switch SW3 nor the brake switch SW6 is closed (step 41), the control valve V1 and the vent valve V2 are deactivated, while the release valve V3 is actuated (step 43). When the supply of negative pressure from the vacuum actuator AC is cut off in this way, the throttle valve SV gradually closes. As a result, the velocity of the vehicle gradually decreases. The opening of the set switch SW4 is detected (step 44). The velocity which is realized when the set switch SW4 opens is stored in the memory (step 45). Again, either the clutch switch SW3 or the brake switch SW6 capable of stopping the velocity-sustaining operation is closed (step 46). Then, the controlled state is set to one (S=1) (step 48) unless the velocity-sustaining operation is stopped. Then, control proceeds to the subroutine for actuating all the valves. Specifically, the operation for reducing the velocity is continued as long as the set switch SW4 is closed. The velocity-sustaining operation is resumed at the velocity which was obtained when the set switch SW4 was opened. Then, a check is performed to ascertain whether the clutch switch SW3 or the brake switch SW6 is closed (step 46). If either switch is closed, the controlled state is set to five (S=5) so that control may proceed to a subroutine for stopping the velocity-sustaining operation (step 47). If the set switch SW4 is closed (step 44), then a flag indicating the operation of the vacuum pump is set (step 49).

Subroutine for stopping the velocity-sustaining operation (S=5)

This subroutine is carried out to stop the velocity-sustaining operation when the clutch switch SW3 or the brake switch SW6 is closed during the execution of the subroutine for performing the velocity-sustaining operation under the condition of S=2. A check is performed to determine whether the clutch switch SW3 or the brake switch SW6 is closed (step 51). Then, a check is done to see if some flag indicating abnormality is set (step 52). If no flag is set, the subroutine for the standby condition (S=0) is selected (step 53). A check is made to ascertain whether both the clutch switch SW3 and the brake switch SW6 capable of stopping the velocity-sustaining operation are open (step 51). If so, checks are performed to determine whether the operation of each solenoid acting on the valves V1-V3 is out of order (step 52). If so, all of the valves V1-V3 are deactivated (step 54).

Subroutine for resuming the velocity-sustaining operation (S=6)

This subroutine is carried out to resume the velocity-sustaining operation (S=2) after this operation is halted by opening the clutch switch SW3. First, all of the valves V1-V3 are deactivated (step 61). If it is found that the clutch switch SW3 is open (step 62), control enters the subroutine for actuating all the valves (S=1) (step 63).

Subroutine carried out when the velocity is less than the lower limit (S=7)

If the present velocity is less than the given lower limit (steps 220 and 221), the velocity-sustaining operation is stopped, and the velocity stored in the memory is cleared. More specifically, the velocity stored in the memory is cleared (step 71). All of the valves V1-V3 are deactivated (step 72). Then, control proceeds to the subroutine for the standby condition (S=0) (step 73).

Subroutine for controlling the vacuum pump

Control enters this subroutine at step 222. A check is performed to ascertain whether a flag indicating that the vacuum pump is in operation (step 81). If so, the vacuum pump BP is kept operated (step 83) until the period for which the timer TM1 is set elapses (step 82). Thereafter, the flag indicating the operation of the vacuum pump is reset (step 84). Then, the timer TM1 is reset (step 85). If it is found that this flag is not set (step 81), a check is done to determine whether a flag indicating that the vacuum switch is closed is set (step 86). If the flag is not set, a check is performed to see if the vacuum switch SW7 is closed (step 91). If this switch SW7 is not closed, the operation of the vacuum pump BP is stopped (step 90). If it is found that the vacuum switch SW7 is closed (step 91), then the flag indicating that the vacuum switch is closed is set (step 92). Once this flag is set (step 92), a check is made to ascertain whether the flag indicating that the vacuum switch is closed is set (step 86). If so, the vacuum pump BP is kept in operation (step 83) until the period for which the timer TM2 is set elapses (step 87). Then, the flag indicating that the vacuum switch is closed is reset (step 88). The timer TM2 is reset (step 89). The operation of the vacuum pump BP is stopped (step 90).

The above-described example of the velocity-sustaining apparatus incorporating the novel output condition monitor apparatus comprises: an electronic control means CPU; a vacuum actuator that is actuated in response to the output from the control means; a control valve V1, a vent valve V2, and a release valve V3 which are disposed on the input side of the actuator and can be actuated by their respective solenoids; comparator means for comparing control outputs delivered from the control means with control inputs applied to the solenoids; monitor means which halt the operation of the control means when a timer TM1 indicates that an error signal produced from the comparator means persists for a certain period; and time limit means which inhibits the control means from resuming its normal operation when a timer TM2 indicates that the output from the monitor means persists for a given period. The control means, the monitor means, and the time limit means are incorporated in a microcomputer fabricated on a single integrated-circuit chip. Also, the output condition monitor apparatus may be built from comparator circuits, coincidence circuits, time limit circuits, timer circuits, or the like.

In the illustrated example of the velocity-sustaining apparatus incorporating the novel output condition monitor apparatus, when any one of the control valve V1, the vent valve V2, and the release valve V3 gets out of order, the functions of all the valves are stopped. Therefore, it is unlikely that the vehicle gets out of the control of the velocity-sustaining operation in an uncontrolled manner.

Usually, the period of time for which the timer TM1 is set is longer than the period of time for which the timer TM2 is set. The timer TM1 of the monitor means measures the duration of the output from the comparator means. The timer TM2 of the time limit means measures the duration of the output from the monitor means.

In the illustrated example of the velocity-sustaining apparatus including the novel output condition monitor apparatus, the LED is lit up to indicate the occurrence of an abnormality (step 231). In some cases, the LED may not be lit up unless the vehicle falls into a certain state or the velocity-sustaining apparatus is operated in a specific mode. In these cases, the LED may be replaced with a nonvolatile memory. Further, it is possible to use the LED and a nonvolatile memory in combination. Data may be read from the nonvolatile memory by operating a switch or changing the connection of a connector.

Also in the above example, the CPU constituting the electronic control means is built from a microcomputer fabricated on a single integrated-circuit chip. It is to be noted that the present invention is not limited to such a microcomputer; other circuit configuration may also be employed.

As described above, the novel output condition monitor apparatus compares control outputs delivered from the electronic control means with control inputs applied to the solenoids for driving the actuator. When an error signal from the comparator means persists for a certain period, the operation of the electronic control means is halted. When this halted condition continues for a given period, the electronic control means is stopped from resuming its normal operation. Hence, the electronic control means can limit the maximum amount of electric power consumed at the place where an abnormality occurs by the continued halted state, without producing control signals again.

What is claimed is:

1. A velocity-sustaining apparatus comprising:
   a detector means for detecting the velocity of a vehicle in which the apparatus is installed;
   a storage means in which a desired velocity is stored;
   an actuator means for opening or closing a throttle valve of the vehicle;
   an electronic control means for comparing the velocity detected by the detector means with the velocity stored in the storage means and providing an output signal to a driver means which provides an input signal to the actuator means in such a way that the difference between the detected velocity and the stored velocity is reduced down to zero;
   a comparator means for comparing the output signal from the electronic control means with the input signal to the actuator means;
   a monitor means which stops the operation of the electronic control means when said output signal and said input signal do not agree;
   wherein said monitor means has a first time limit means and provides an output signal which stops the operation of the electronic control means when the time limit means indicates that disagreement between said output signal from said electronic control means and said input signal persists for a first period of time;
   wherein said monitor means has a second time limit means which inhibits the electronic control means from resuming its normal operation when said output signal from said monitor means persists for a second period of time; and
   wherein the first period of time for which said first time limit means is set is longer than the second period of time for which said second time limit means is set.

* * * * *